United States Patent [19]

Williams et al.

[11] 4,039,060
[45] Aug. 2, 1977

[54] BARRIER-GUARDED STAMPING PRESS CONTROL

[75] Inventors: Roy G. Williams, St. Louis County; Robert L. Cantrell, Jr., St. Louis, both of Mo.

[73] Assignee: Essex Cryogenics Industries, Inc., St. Louis, Mo.

[21] Appl. No.: 568,600

[22] Filed: Apr. 16, 1975

[51] Int. Cl.$^2$ ............................................. F16D 7/00
[52] U.S. Cl. ................................... 192/134; 192/130; 192/131 R; 100/53
[58] Field of Search ............... 192/134, 133, 131, 130, 192/129; 100/53

[56] References Cited

U.S. PATENT DOCUMENTS

| 2,382,316 | 8/1945 | Hodges | 192/134 |
| 2,724,281 | 11/1955 | Knoth | 192/130 |
| 3,103,270 | 9/1963 | Tilbury | 192/131 |
| 3,815,456 | 6/1974 | Braathen | 192/131 |
| 3,848,121 | 11/1974 | Smit | 192/134 |

FOREIGN PATENT DOCUMENTS 694,097  7/1953  United Kingdom .................. 192/131

Primary Examiner—Samuel Scott
Assistant Examiner—Randall Heald
Attorney, Agent, or Firm—Ralph W. Kalish

[57] ABSTRACT

A stamping press system, the press having a ram, a driving means for the ram, and an electrically energizable ram control device for causing the driving means to drive the ram through a stamping cycle. The press is guarded by a barrier movable between an open position permitting operator access to the point of stamping operation and a closed position barring such access. A press trip control for the system has a pair of actuators, one for each hand of the operator. Upon their concurrent actuation, the actuators cause movement of the barrier to the closed position and energization of the ram control device initiating a stamping cycle. Provision is included for preventing such energization thereby preventing a stamping cycle if the barrier is not closed. Circuitry of the system prevents re-energization of the ram control device, thus preventing a further cycle until the operator has removed both hands from the actuators.

12 Claims, 13 Drawing Figures

BARRIER-GUARDED STAMPING PRESS CONTROL

BACKGROUND OF THE INVENTION

The present invention relates to stamping press control systems and, more particularly, to such systems of the type having electrical circuitry for controlling and providing interlocked stamping and safety functions in operation of a stamping press.

Prior to stamping safety regulations and standards promulgated by governmental agencies, it was common to protect stamping press operators from injury by using only such safety devices as two-hand actuators or so-called "trips". However, under some circumstances, it was still possible for an oprator to inadvertently place one or both hands within the point of stamping operation of the press ram during unsafe times. Moreover, the use of two-hand trip actuators did not, in some cases, preclude an operator from typing down one actuator, thereby freeing one hand which might then be placed within the point of stamping operation during unsafe times.

SUMMARY OF THE INVENTION

Among the several objects of the invention may be noted the provision of an improved stamping press system; the provision of an improved control system for controlling the operation of a stamping press; the provision of such systems having barrier protection for the press operator of the stamping point of operations; the provision of such systems having anti-repeat functions for precluding unintended repetition of a stamping cycle; the provision of such systems preventing single-handed initiation by the press operator of a stamping cycle thereby preventing "tie-down" operator of trip actuators by the operator; and the provision of such systems which are intrinsically safe in operation, relatively simple in construction, economically manufactured and installed, and reliable in operation.

By way of a brief description, a barrier-guarded stamping press system of the present invention comprises a stamping press having a ram and means such as a flywheel for driving the ram. Electrically energizable ram control means, such as a solenoid-volved air clutch or solenoid-actuated trip dog, is provided for causing the ram driving means to drive the ram via a crankshaft through a stamping cycle or so-called press stroke, wherein it will be understood that when the press is "tripped", the ram descends rapidly for stamping as in metal forming and then rises to the starting position for another cycle. The present system contemplates the use of a barrier for guarding the ram area or so-called "point of operation". The barrier is movable between an open position permitting access by the hands of the press operator to the point of stamping operation and a closed position barring said access. A suitable barrier control means is electrically energizable (preferably a solenoid controlling an air cylinder) for moving the barrier from the open position to the closed position. A circuit is included for providing power from an a.c. power source (such as a.c. line voltage) to the system. The system further comprises a press trip switch having a pair of actuators each of which is adapted for actuation by a respective one of the press operator's hands. The trip switch completes an electrical trip circuit in response to concurrent actuation of the actuators by the operator's hands. The system includes a first relay means operative in response to said a.c. power and adapted, when operative, for providing this power to a second relay means. A press ram position switch is interconnected with said first relay means for enabling its operation when the ram is in a position ready for stamping and is also operative to thereafter disable operation of the first relay means after said ram has moved during a stamping cycle from the ready position. A second relay means is interconnected with the first relay means and with the ram position switch. This second relay means is operative by said a.c. power only upon both actuation of said first relay means and completion of the electrical trip circuit. Its operation causes the a.c. power to energize the barrier control means. This moves the barrier to its closed position. A barrier safety switch detects the closed position. Circuit means which is interconnected with the barrier safety switch and with the second relay means energizes the ram control means by the a.c. power to initiate a stamping cycle if the barrier is detected in the closed position when the second relay means is operated. A reset circuit re-enables operation of the first relay means at the end of a stamping cycle when the operator removes both hands from the actuators. Finally, provision is made for causing the barrier control means to move the barrier from the closed position to the open position upon completion of a stamping cycle.

Various other objects and features of the invention are either apparent or are pointed out hereinafter.

BRIEF DESCRIPTION OF THE DRAWINGS

Corresponding reference characters refer to corresponding parts throughout the several figures of the drawings.

DESCRIPTION OF THE PREFERRED EMBODIMENTS

A first embodiment of the present stamping press system is illustrated by FIGS. 1–6. The press in this system is of the type which is mechanically tripped, as is explained below. Hence, this embodiment may be referred to as the mechanical press system.

Figure 1:
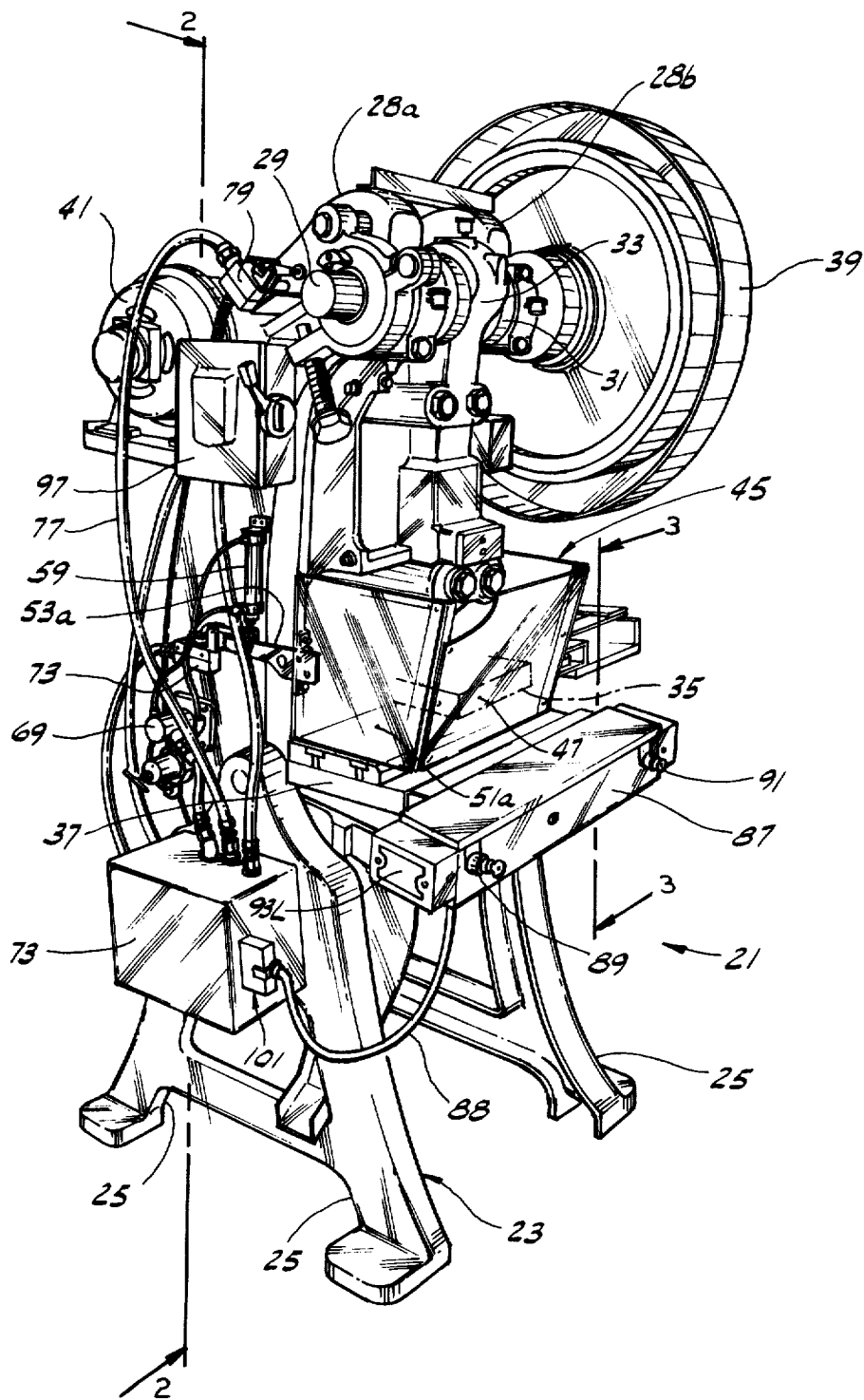
FIG. 1 is a perspective view of a first embodiment of a stamping press system of the present invention wherein the press is of a first so-called mechanical type.
Figure 2:
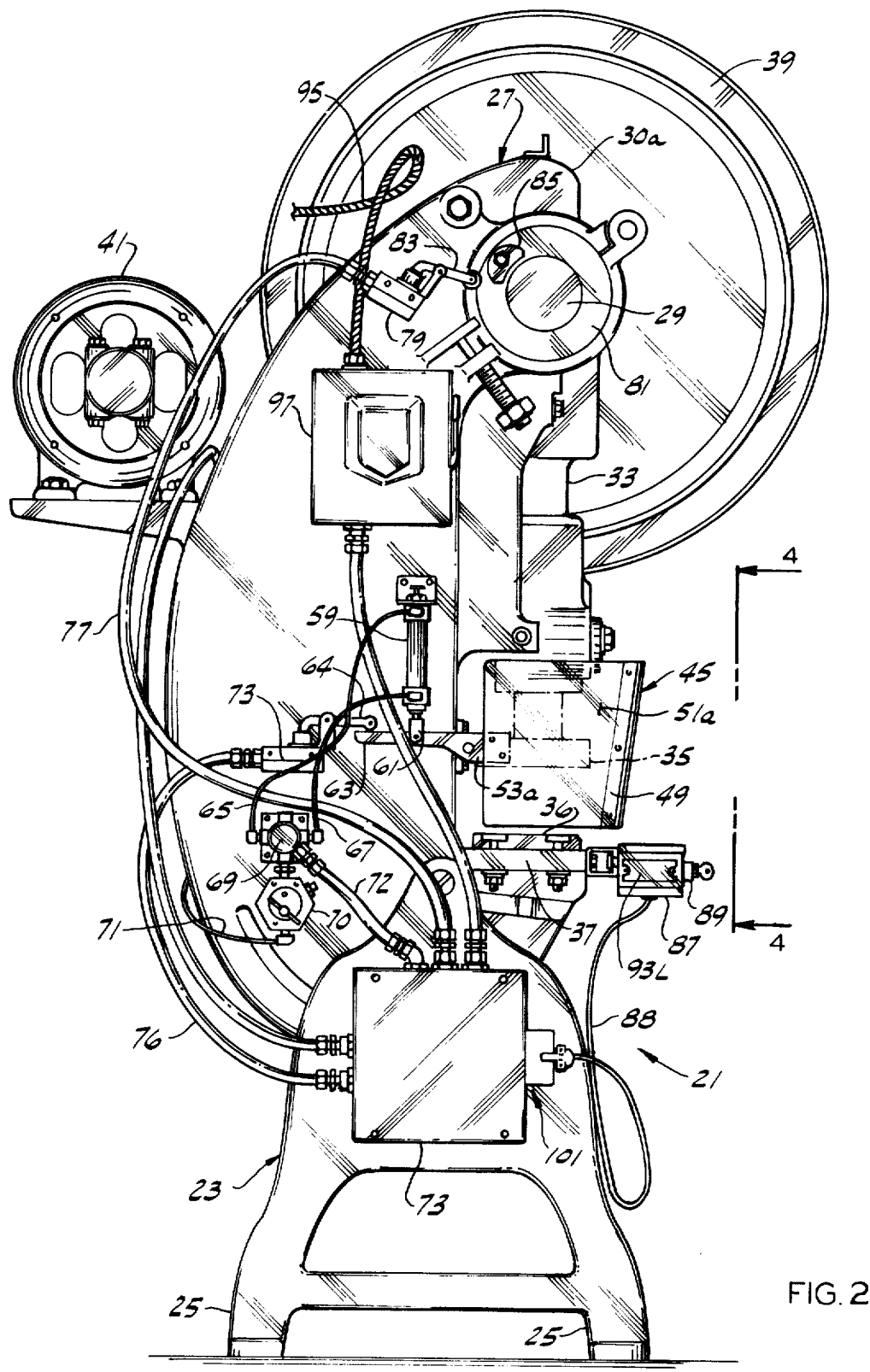
FIG. 2 is a left side elevation of salient portions of the embodiment of FIG. 1 and taken along line 2—2 of FIG. 1.
Figure 3:
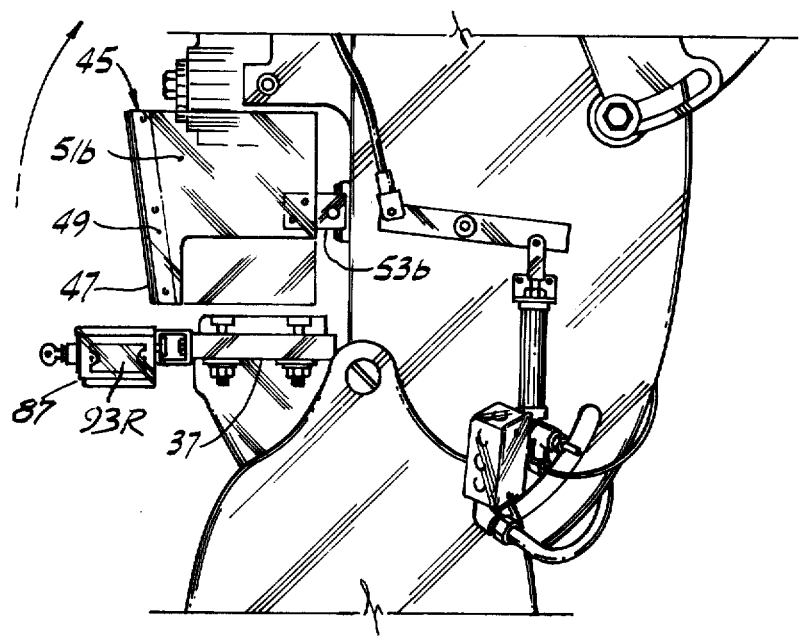
FIG. 3 is a right side elevation of certain barrier and control features of the FIG. 1 embodiment and taken along line 3—3 of FIG. 1.
Figure 4:
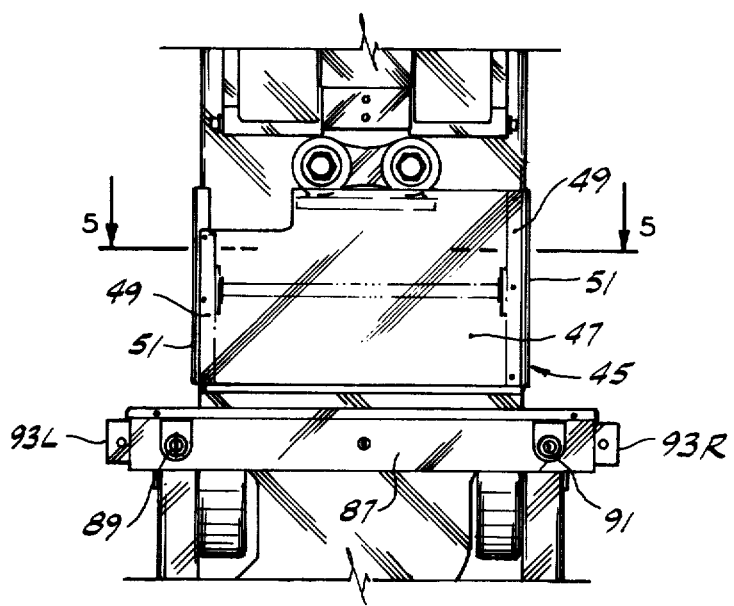
FIG. 4 is a front elevation of the barrier and control features shown in FIG. 3, taken along line 4—4 of FIG. 2.
Figure 5:
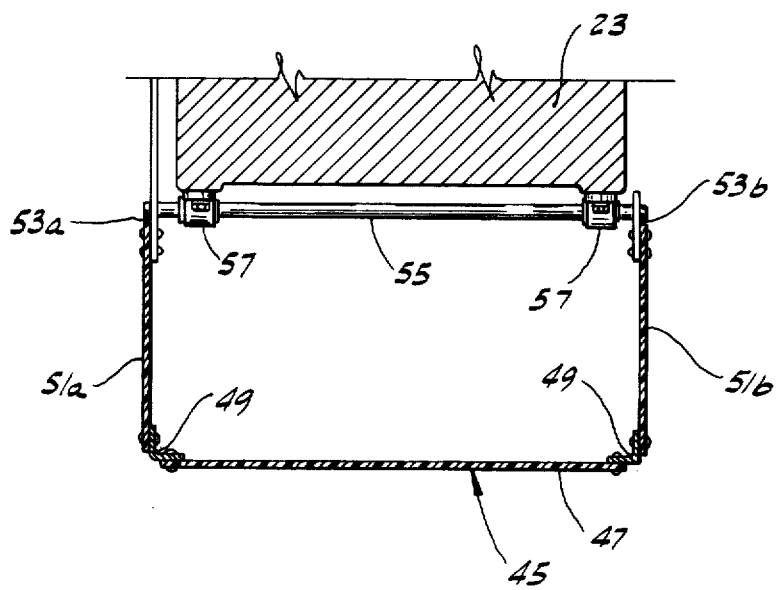
FIG. 5 is a horizontal plan view, partly in cross-section, taken along line 5—5 of FIG. 4, illustrating features of a barrier of the FIG. 1 embodiment.

Referring now primarily to FIGS. 1 and 2, the mechanical punch press is designated generally by reference numeral 21. Although press 21 is of a conventional type, it is briefly described herein in the interest of clarifying the description of the present system and control features thereof.

Press 21 has a frame shown generally at 23 having legs 25 which support the press. An upper portion generally designated 27 of the frame is bifurcated, having arms 28a and 28b in which are journalled opposite ends a crank shaft 29. A connecting rod 31 is journalled at one end on a crank 33. Carried at the other end of connecting rod 31 is a ram 35 to which a suitable die or the like is secured for stamping or forming metal, for example, in various shapes by pressure against a corresponding die 36 or the like on the bed 37 of the press upon rotation of the crank 33.

A flywheel 39 having high inertia is constantly rotated during normal operation by a suitable a.c. motor 41 as is conventional. A trip dog (not shown) is adapted for being actuated by a suitable solenoid (not shown) The winding of the trip dog solenoid is designated at 43W in FIG. 6. When energized winding 43W causes the trip dog to couple flywheel 39 to crankshaft 29 causes the ram 35 to stroke and thereby to carry out a stamping operation as crankshaft 29 completes a single revolution, whereupon ram 35 returns to its starting position for a subsequent stamping operation.

As used herein, the term "cycle of operation" contemplates a single stroke of the ram. The term "point of stamping operation" or "point of operation" is construed as meaning the area between the upper die 35 and lower die 36.

It will be understood that during normal operation of press 21, it may be desirable or necessary for the person operating the press system to place either or both of his hands within the point of operation, as in placing or relocating or adjusting the position of parts to be stamped.

In order to preclude the possibility of the operator placing his hands within the point of operation at unsafe times, e.g. just after the press dog has tripped but before a stroke of the ram has been made, a barrier 45 is provided.

Barrier 45 is shown in the drawings in what may be referred to as a closed position in which it guards the point of stamping operation by barring access thereto of the operator's hands. It is movable between this closed position and a raised or so-called open position permitting access to the point of stamping operation by the operator.

Barrier 45 is preferably constructed of transparent panels such as of synthetic resin material in order to permit the operator to view the stamping operations. The barrier includes a transparent front panel 47, secured by L-shaped channels 49 bolted along each side edge to identical side panels 51a and 51b. The side panels are carried by corresponding pivot arm 53a and 53b extending rearwardly from the rear edge of the side panel toward the press frame 23. Arms 53a and 53b are each secured to a pivot rod 55 rotatably mounted by pivot blocks 57 bolted to frame 23. Accordingly, barrier 45 may be rotated about the axis of pivot rod 55 between the lowered or closed position shown and the raised or open position.

Means for opening and closing barrier 45 is constituted by a double-acting air cylinder 59 having clevis 61 of its shaft pivotally secured to a rearward extension 63 of arm 53a such that when the shaft of air cylinder 59 is extended by air pressure, arm 53a rotates barrier 45 from the closed to the open position. Air lines 65 and 67 interconnect cylinder 59 with a two-way solenoid valve 69. A winding for actuating valve 69 is designated 69W in FIG. 6. This winding is connected by a cable 72 with control circuitry in a junction box 73 mounted on the side of frame 23. Air under suitable pressure is supplied to solenoid valve 69 by a pressure regulator 70 to which is connected an air line 71.

A limit switch 75 is positioned also on the frame for being actuated by the rear arm portion 63 via follower arm 64. Switch 75 is connected by a cable 76 to junction box 73 and serves as a barrier safety means for detecting the closed position of barrier 45, as is explained hereinbelow.

Also connected by a cable 77 to junction box 73 is another switch 79 mounted on the press frame adjacent a flange 81 of crankshaft 29. Switch 79 is positioned for being actuated by a cam follower 83 upon rotation of the crankshaft when the follower is engaged by a cam 85 on flange 81 for purposes clarified below.

A control box 87 for use by the press operator for operating the press is positioned at the front of the press and contains circuitry which is connected by a cable 88 with other control circuitry in junction box 73. Control box 87 has a front panel having a first key-lock switch 89 for turning the press system on or off and a second key-lock switch 91 for selecting run or jog functions of the press. At each end of control box 87 is a touch actuator, these touch actuators being designated 93L and 93R, corresponding to the left and right hands of the press operator. The actuators are part of an electronic touch trip device available from Ex-Cel Corporation as Model 210 which operates to electronically complete a circuit for initiating a stamping cycle of the press, as later explained, if the actuators are touched substantially simultaneously, e.g., within 0.1 second of one another.

A.C. power, e.g., from a 240 volt line, for operation of the press control circuits and motor 41 is provided by a cable to a switch box 97 and then via another cable 99 to junction box 73.

Figure 6:
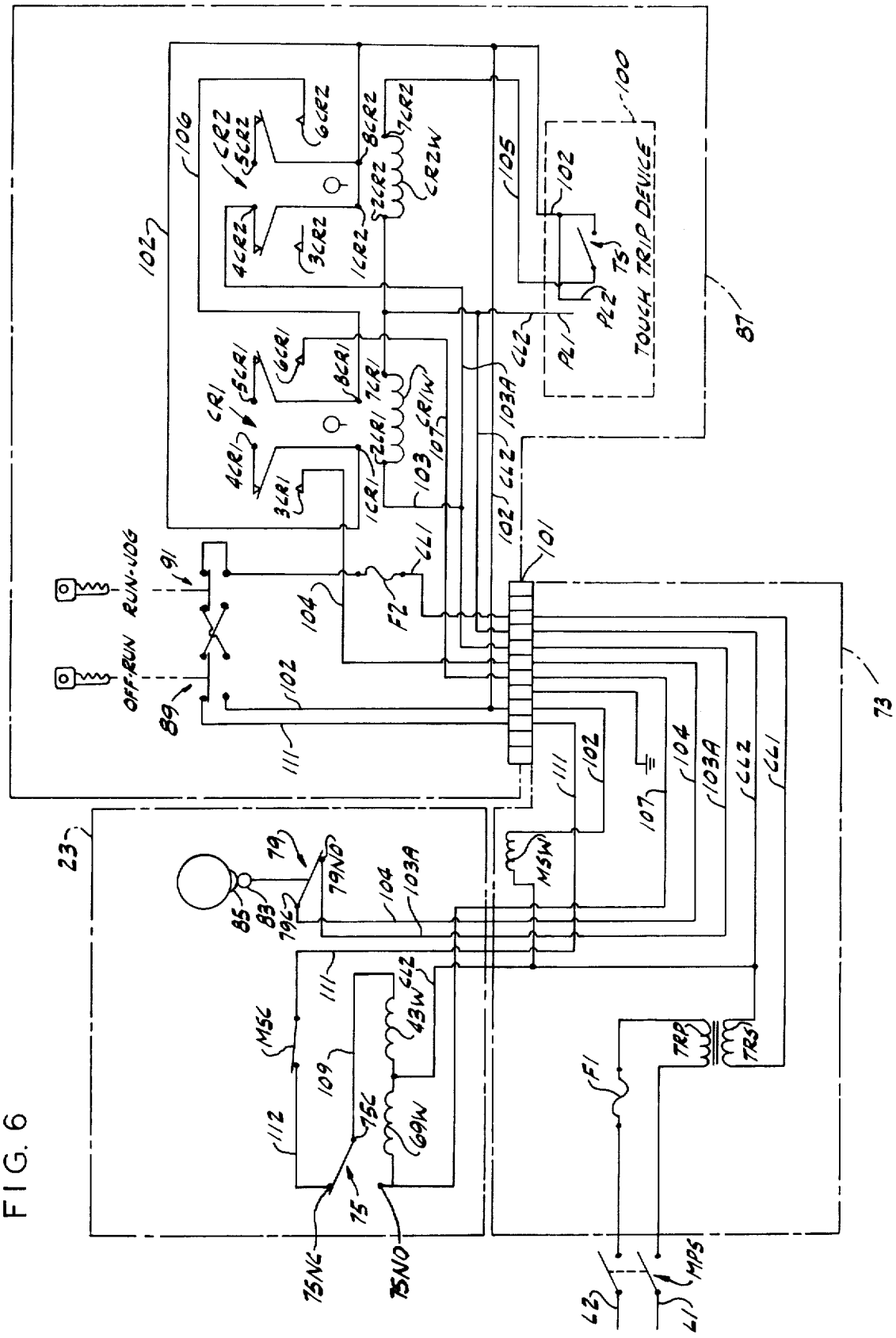
FIG. 6 is a circuit diagram of a control system of the invention as connected in the embodiment of FIG. 1.

Referring now to FIG. 6, detailed operation of the present system is best understood from the following explanation of control circuitry of the system in terms of operational modes provided thereby.

a. Run Mode

A.C. power from two legs L1 and L2 of a three-phase, 60 Hz utility line service at 240 volts is supplied through a main power switch MPS, thence through a fuse F1, to the primary winding TRP of a step-down transformer in order to provide voltage at a suitable level, viz., 15 VAC across the secondary winding TRS and then, by means of CL1 (the high or so-called "hot" side) and lead CL2, (the neutral or common side) to circuitry of the control. These circuit elements are located within junction box 73 which is indicated by an out line. Control box 87 is also outlined in FIG. 6 to indicate elements therein. Other circuit elements are located elsewhere on the press frame 23 which is also symbolically outlined in FIG. 6.

A cable plug and receptacle arrangement 101 is depicted as interconnecting junction box 73 and control box 87. By this means, leads CL1 and CL2 are connected to the circuits of control box or unit 87. Lead CL1, which is high, is connected through a fuse F2 to run-jog switch 91, which is shown in the "run" position in which the normally-closed contacts thereof supply power to one of the normally-open contacts of off-on switch 89, which is shown in the "off" position. When moved to the "on" position, switch 89 supplies power to a lead 102. This lead in turn supplies power to an input power lead PL2 of the touch trip device, designated 100. Another input power lead thereof is designated PL1.

These two power leads provide a.c. power for circuits (not shown) of touch device 100 for normal operation thereof. A switch TS of this device is normally open but is electronically closed when the actuators 93L and 93R are touched substantially simultaneously. Lead 102 also supplies power through the plug and receptacle means 101 to the coil or winding MSW of the motor starter for motor 41. When winding MSW is energized, motor 41 operates, driving flywheel 39.

At CR1 and CR1 are shown two relays within control box 87. Relay CR1 may be regarded as an anti-repeat relay and relay CR2 may be regarded as a trip relay, as will be made clear. A.C. power is supplied by lead 102 to a contact 1CR1 for a blade normally closed on an unconnected contact 4CR1. Power is also supplied by lead 102 to both of contacts 1CR2 and 8CR2 for two blades of relay CR2, one of which is normally closed on an unconnected contact 5CR2 but the other of which is normally closed on a contact 4CR2. From the latter contact, the a.c. power flows via a lead 103A to a contact 2CR1 for energizing the winding CR1W of relay CR1. The other side of this winding is connected by a terminal 7CR1 to the neutral lead CL2. Accordingly, the blades of relay CR1 close on respective normally open contacts 3CR1 and 6CR1. Hence, a.c. power flows via lead 104, thence through junction box 73, to the common contact 79C of cam-operated switch 79. Cam lobe 85 through the actions of cam follower 83 closes the blade of this switch on a normally open contact 79NO whenever the press ram is in the starting position ready for a stamping cycle. Lead 103A accordingly supplies a.c. power from contact 79NO back through junction box 73 and into control box 87, thence to contact 2CR1, for a purpose which will become apparent.

Control unit 87 may be secured to the press such that it is readily detachable, the plug and receptacle means 101 being readily disconnected at junction box 73. Hence, unit 87 may be used on other types of presses configured in accordance with the invention, including the second embodiment described below, and may readily be replaced should a malfunction occur, thereby minimizing press down-time while repairs are effected. Thus, the present system is desirably modularized for easy repair or replacement.

b. Trip Mode

Assuming that the ram is in the starting position and that it is desired to initiate a stamping cycle, it is necessary for the press operator to touch trip actuators 93L and 93R concurrently, i.e., substantially simultaneously. If this is done, trip switch TS closes, sending a.c. power via lead 105 to contact 7CR2 for energizing the winding CR2W of relay CR2. This opens the circuit through contact 4CR2 which initially energized relay winding CR1W. However, the latter remains energized because of the circuit through contact 79C and 79NO of cam switch 79. Thus, the latter provides a hold-in circuit for relay CR1.

With winding CR2W energized, a circuit is completed between contacts 8CR2 and 6CR2. A.C. power is then supplied from the latter contact via lead 106 to contact 8CR1. Because relay winding CR1W remains energized, a circuit is completed between contacts 8CR1 and 6CR1, the latter then providing a.c. power through lead 107 (which passes through junction box 73) to the normally open contact 75NO of barrier position detector switch 75 and also to one side of barrier control solenoid winding 69W. The other side thereof is connected to a branch of neutral power lead CL2. The resultant energization of winding 69W permits air to enter air line 67 (see FIG. 2) causing the piston within air cylinder 59 to swing 53a downward, closing barrier 45 (position shown).

Switch 75 detects this closed position and its actuation opens the circuit between common contact 75C and normally closed contact 75NC and closes the circuit between contact 75NO and 75C. A.C. power is thus supplied by lead 109 to one side of trip solenoid winding 43W, causing actuation of the trip dog for coupling flywheel 39 to crankshaft 29. The press ram thereby begins to move downward through a stamping cycle. As the crankshaft rotates 15° to 20° "off center", i.e., from the starting position, cam switch 79 is actuated, opening the circuit between contacts 79C and 79NO. Consequently, the holding circuit for relay winding CR1W is broken and this winding is de-energized.

With relay CR1 de-energized, its contact circuit which supplies a.c. power to lead 107 is opened, causing both of windings 69W and 43W to be de-energized. At this point in time, the press crankshaft completes its rotation, the trip dog being conventionally mechanically disengaged as the ram reaches the top of its stroke. When winding 69W is de-energized, solenoid valve 69 permits air to enter the upper side of cylinder 59, causing the barrier to move to its raised, i.e., open position.

Resetting of the circuit is effected when the operator removes both hands from actuators 93L and 93R. This opens trip switch TS, removing power from lead 105 and thereby de-energizing relay winding CR2W. This permits power for lead 102 to enter lead 103 by a circuit through contact 4CR2, causing re-energization of relay winding CR1W. Circuits are once again completed between contacts 1CR1 and 3CR1 and between contact 8CR1 and 6CR1. Hence, the system is reset and ready for a further stamping cycle.

c. Jog Mode

In order to move the press ram by small increments, as in set-up operations, it is desired that the operator cause rotation of crankshaft 29 by a controllable degree. For this purpose, run-jog switch 91 is moved from the run position shown to the jog position, thus supplying a.c. power from lead CL1 through the normally-closed contacts of switch 89 to lead 111 and, by plug and receptacle means 101, through junction box 73, through a set of normally-closed contacts MSC controlled by motor start winding MSW. These contacts open upon energization of winding MSW for a purpose explained below. When closed, they permit a.c. power from lead 11 to be supplied by a lead 112 interconnected with the normally-closed contact 75NC of barrier position detector switch 75. With the latter switch in the position shown (the barrier being raised, i.e., open), a.c. power is then provided to lead 109 for energization of trip dog solenoid winding 43W. This causes the trip dog to mechanically engage flywheel 39 which may then be rotated by hand as desired to jog or position the ram, e.g., for set-up.

If for some reason motor starter winding MSW should be energized causing motor 41 to begin operations, it would be dangerous to permit energization of trip dog solenoid winding 43W if barrier 45 were open, since a press stroke could occur at a time when the press point of operation is unguarded. Accordingly, contacts MSC open if winding 43W is energized to prevent this from happening.

A second embodiment of the stamping press system is illustrated by FIGS. 7 - 13 wherein the press is of the type having a conventional air clutch for coupling the flywheel to the press crankshaft. This embodiment may be referred to as the air clutch press system. The air clutch press is designated at 221.

As with mechanically-tripped press 21, air clutch press 221 is of a commercial type, except as modified by incorporation of a barrier 245, means for opening and closing the barrier, and various controls and circuits as described hereinbelow. Moreover, press 221 will be understood to have a ram 235 suitably driven by a crankshaft 229 (FIG. 12) when the latter is coupled by a conventional air clutch (not shown) to the usual flywheel.

Figure 7:
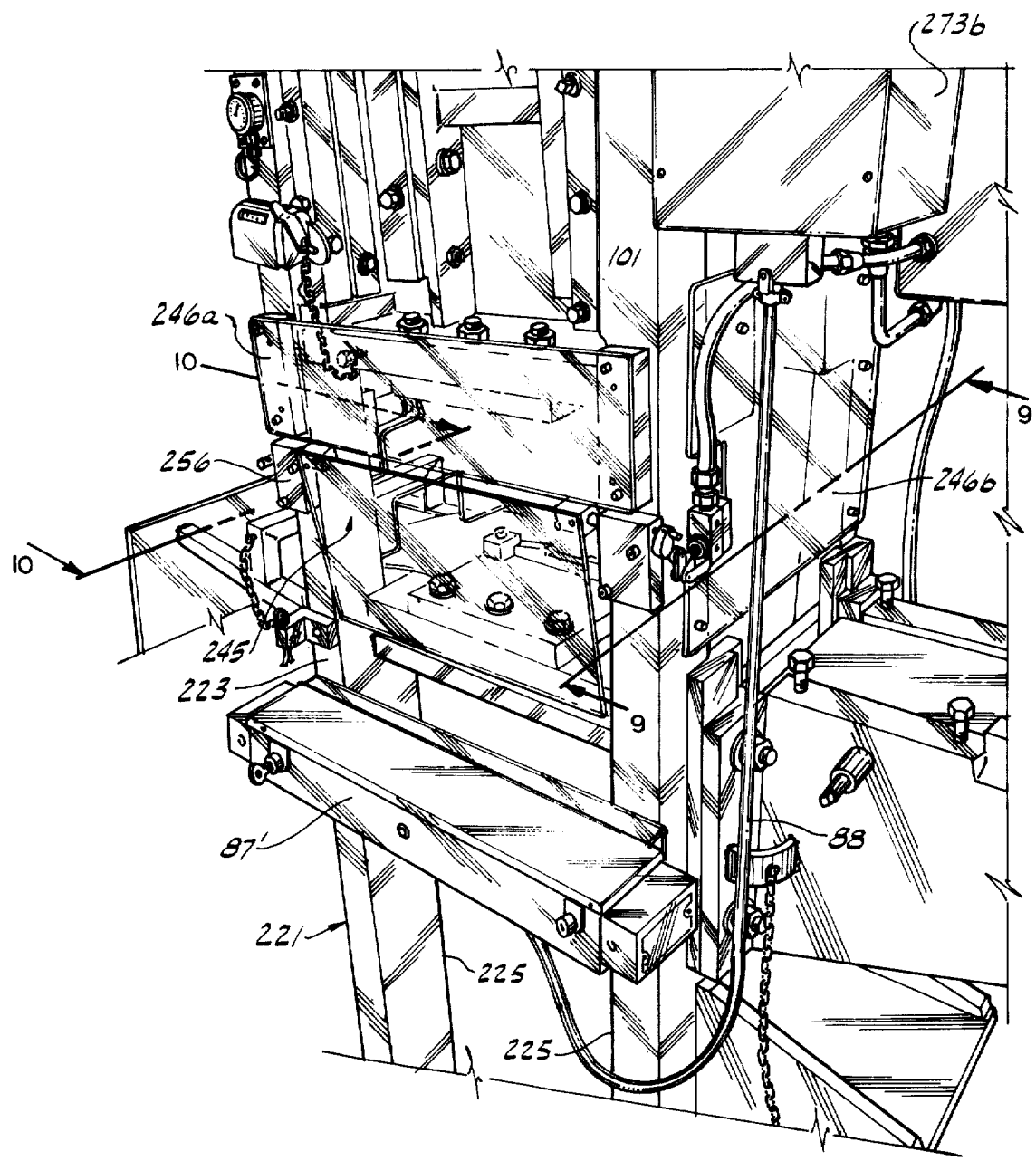
FIG. 7 is a perspective view of portions of another embodiment of the present stamping press system wherein the press is of the so-called air clutch type and particularly illustrated barrier and control features of this embodiment, the barrier being in a closed position.
Figure 8:
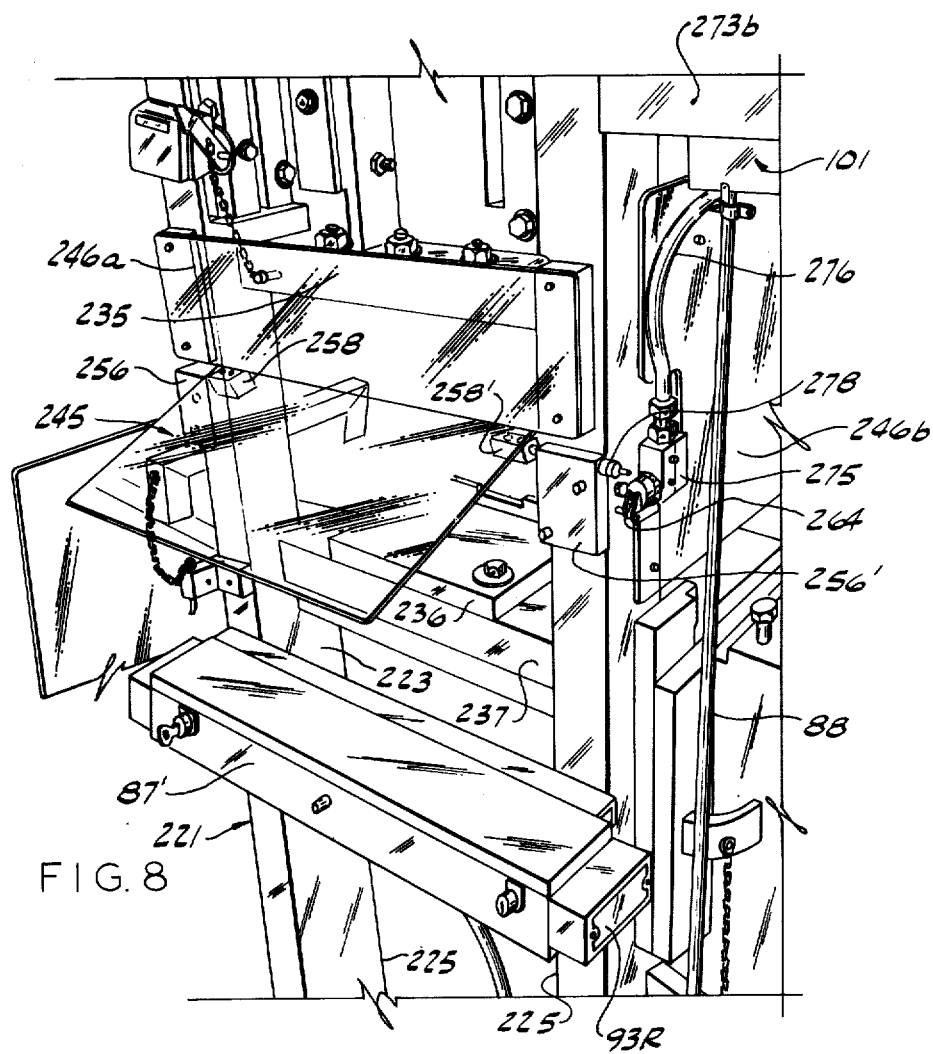
FIG. 8 is a perspective view similar to FIG. 7 but wherein the barrier illustrated in FIG. 7 is shown in an open position.
Figure 12:
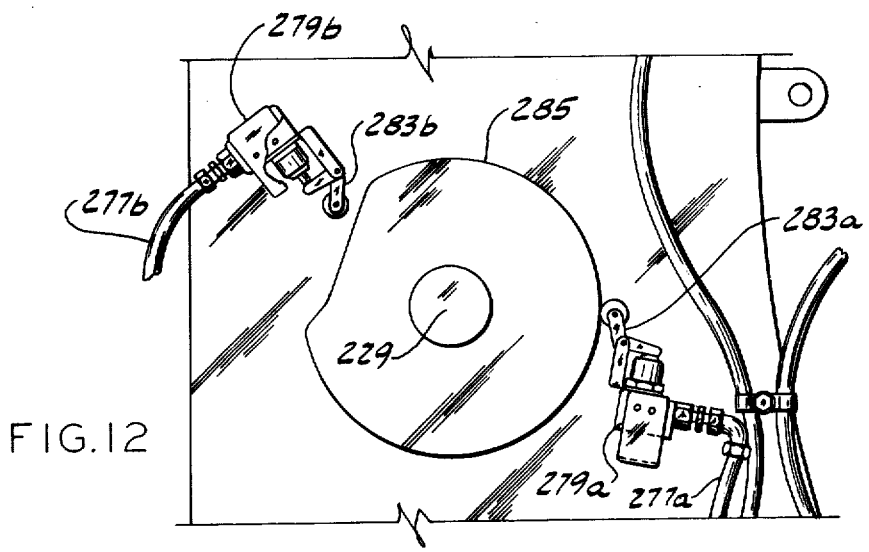
FIG. 12 is a side elevation of a certain cam and cam follower-operated switches of the embodiment of FIG. 7.
Figure 9:
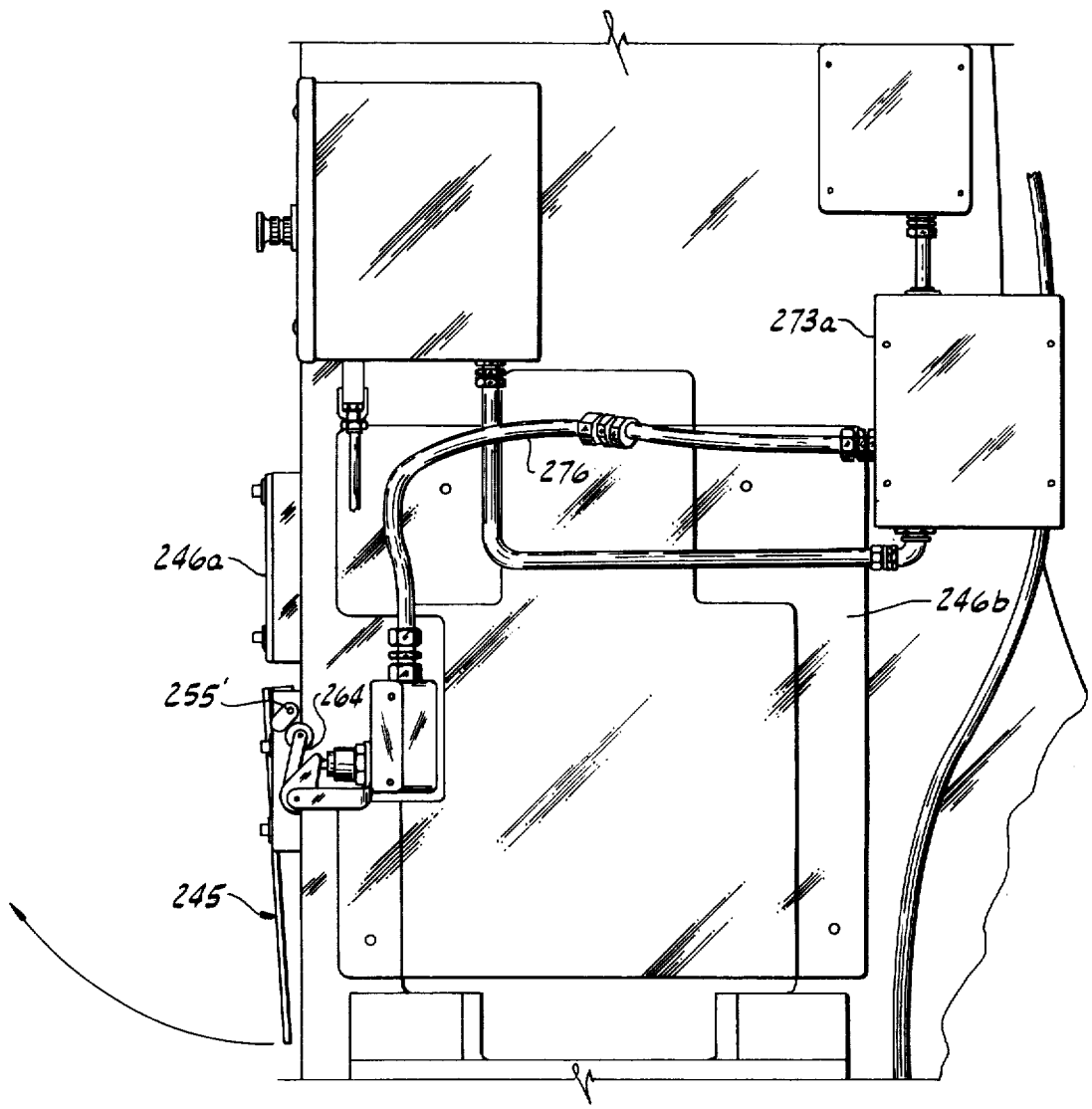
FIG. 9 is a right side elevation taken along line 9—9 of FIG. 7 and showing certain barrier and switch features of the embodiment of FIG. 7.
Figure 10:
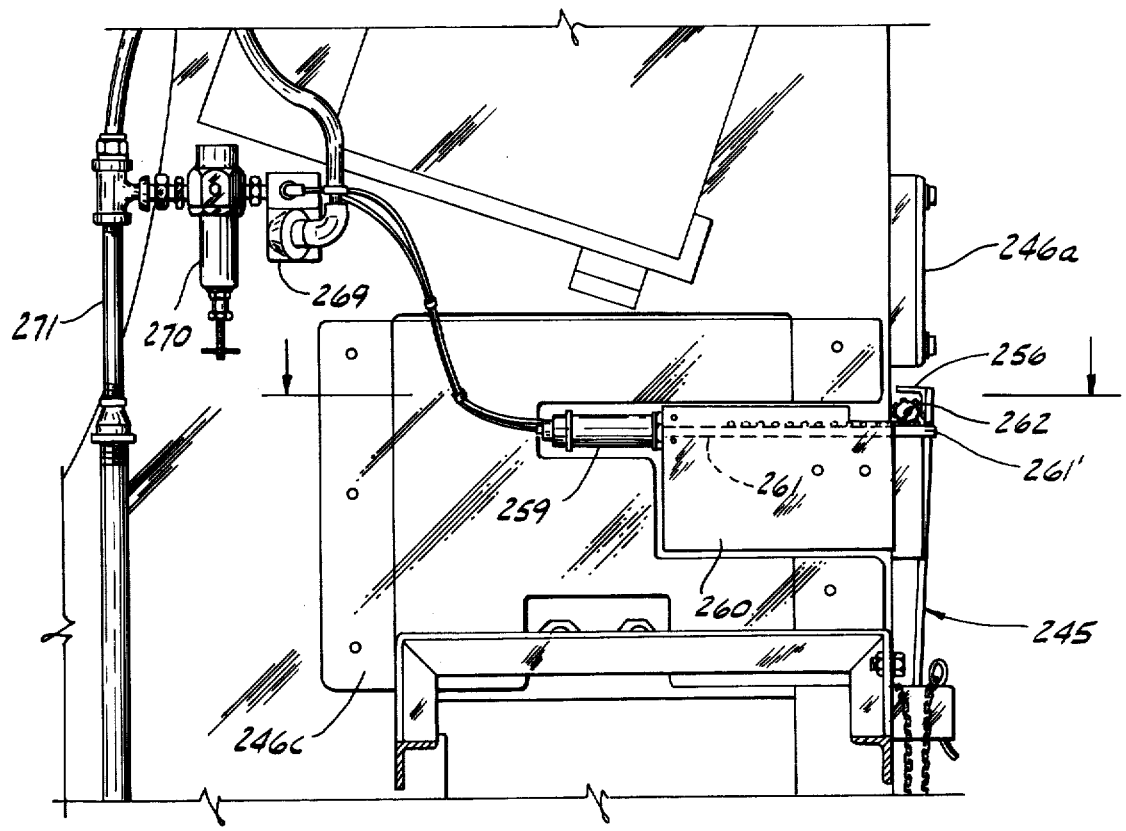
FIG. 10 is a left side elevation taken along line 10—10 of FIG. 7, illustrating certain barrier features and barrier control apparatus of the embodiment of FIG. 7.
Figure 11:
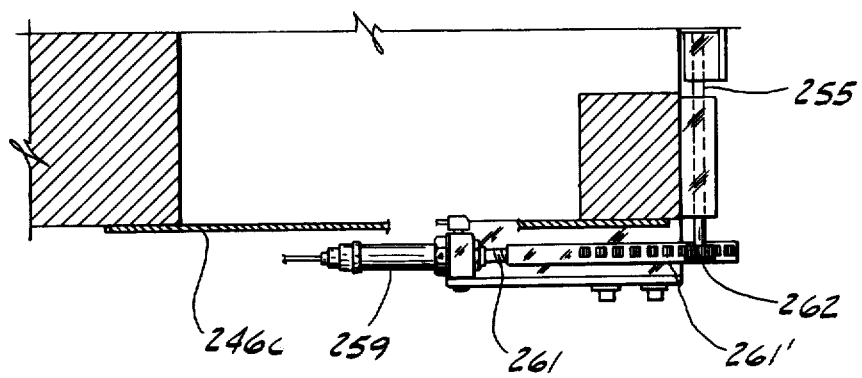
FIG. 11 is a horizontal plan view, partly in cross-section taken along line 11—11 of FIG. 10, illustrating certain barrier operating apparatus in the embodiment of FIG. 7.

Referring primarily to FIGS. 7 and 8, showing barrier 245 closed and open, respectively, press 221 has a frame 223 with legs 225 supporting the press. The press ram is designated 235 and carries a suitable die, e.g., for forming metal by pressure against a die 236 on the press bed 237 upon rotation of the press crankshaft through 360°.

Again, the term point of stamping operation, or simply point of operation is intended as meaning the area between the die carried by the ram 235 and the lower die. Barrier 245, when closed as shown in FIG. 7, guards the press point of operation by preventing access by the press operator thereto. A single panel of transparent material, e.g., a synthetic resin, is used for barrier 245. Other panels of suitable transparent material block other apertures through which access might be had to dangerous areas of the press. Such panels are illustrated at 246a, 246b and 246c.

Barrier 245 is opened and closed by a rack-and-pinion arrangement (FIGS. 10 and 11) operated by a double-acting air cylinder 259 secured to a housing 260 mounted on the left side of press frame 223. The actuator 261' having teeth which engage a pinion 262 secured to a shaft or pivot rod 255 journalled in and extending through a block 256 on the press frame. The other end of shaft 255 is secured as indicated at 258 to the corner of barrier 245 adjacent the left edge thereof. When the piston of air cylinder 259 is moved by air pressure under the control of a two-way solenoid valve 269 toward the front of the press, movement of rack 261' rotates pinion 262 to open the barrier (FIG. 8) movement of the cylinder piston in the reverse direction closes the barrier (FIGS. 7 and 10), as will be apparent. Air under suitable pressure is supplied to solenoid valve 269 by an air pressure regulator 270 from an air line 271.

A limit switch 275 is positioned on the right side of press frame 223 for being actuated via an actuator arm 264 by a cam 278 secured to a shaft or pivot rod 255' journalled in and extending through a block 256' on the press frame and secured as indicated at 258' to the corner of barrier 245 adjacent the right edge thereof. This switch is connected by a cable 276 to a junction box 273a and thence to a junction box 273b secured to the press frame similar to junction box 73 of the mechanical press system. Switch 275 will thus be seen to be actuated by movement of barrier 245 between its open and closed positions and functions as switch 275 in the mechanical press system for detecting the closed position of barrier 245.

Also connected by cables 277a and 277b to junction box 273 are respective limit switches 279a and 279b, each being suitably mounted on the press frame adjacent a cam 285 carried by the press crankshaft 229. Switches 279a and 279b are actuated by respective cam followers 283a and 283b upon rotation of the crankshaft for purposes similar to that served by switch 79 of the mechanical press embodiment.

Referring again to FIGS. 7 and 8, a control box 87' identical to control unit 87 of the mechanical press system is positioned at the front of press 221. Except for a minor wiring change made therein as described below, unit 87' functions in the same way as control box 87 and for the same purposes. Its use by the press operator is also identical to that of unit 87. Consequently, unit 87' will not be described in further detail, its operation being apparent from reference to FIG. 13.

Figure 13:
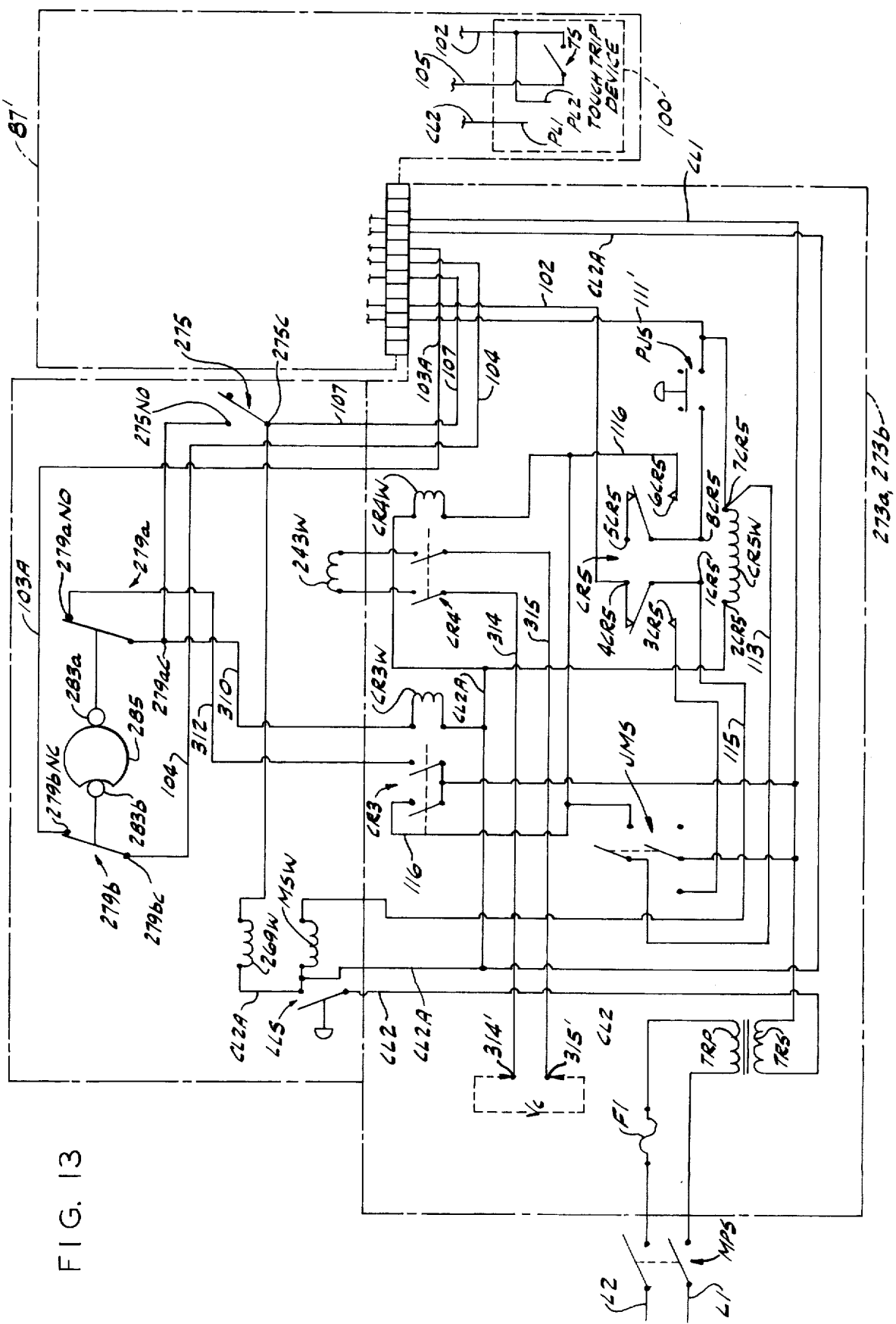
FIG. 13 is a circuit diagram of a control system of the invention as connected in the embodiment of FIG. 7.

Referring then to FIG. 13, detailed operation of this second embodiment may be understood from the following explanation of the control circuitry according the operational modes provided thereby.

a. Run Mode.

A.C. power from two legs L1 and L2 of the 60Hz three-phase line service at 240 volts is supplied through main power switch MPS and fuse F1 to the primary winding TRP of the step-down transformer, all similar to FIG. 6. The secondary winding TRS provides 115 VAC across leads CL1 (high or "hot") and L2 (neutral or common). Lead CL2 runs to an air pressure switch LLS which is suitably controlled by the air source for the system, it being understood that the contacts of switch LLS are normally open if the air pressure is low and close if there is sufficient pressure to operate the press safely thereby to interconnect lead CL2 with a lead CL2A, thus permitting the voltage across leads CL1 and CL2A to be supplied via plug and connector means 101 to control unit 87', as in the first embodiment.

The components within control unit 87' function in the same way as unit 87. Hence, it will be understood that a.c. power is supplied through fuse F2, through run-jog switch 91 (when in the run position), through off-run switch 89 (when in the run position) to lead 102. Thus, a.c. power is supplied across input power leads PL1 and PL2 of touch trip device 100 for enabling its operation.

Lead 102 is interconnected via means 101 with the circuits exterior of unit 87', extending to a contact 4CR5 of a relay CR5. A relay blade normally closed on contact 4CR5 has a terminal 1CR5 by a lead 115 to one side of motor start winding MSW. Hence, the latter is energized causing operation of the motor.

As to unit 87', it will also be understood from the previous description of unit 87 that the voltage on lead 102 energizes winding CR1W of relay CR1, causing the contacts of this relay to provide the a.c. voltage to lead 104. The latter lead runs to the common contact 279bC of switch 279b, which may be termed the anti-repeat switch. When the press ram is in the starting position (i.e., ready for a stamping cycle) the switch blade thereof is normally closed on a contact 279b thus interconnecting lead 104 with lead 103A which runs back through plug and connecter means 101 for the same purpose as for unit 87 in the first embodiment.

b. Trip Mode

When the press operator touches trip actuators 93L and 93R substantially simultaneously, trip switch TS closes, supplying power for energizing relay winding CR2W. Although, as in the first embodiment, this opens the circuit through which the winding of relay CR1 was energized, the now-closed circuit through switch 279b provides a hold-in circuit for keeping relay winding CR1W energized.

With both relays CR1 and CR2 now energized, a.c. power is supplied to lead 107 and, via plug and connector means 101, thence to the common contact 275C of barrier position detecting switch 275, and thence also to one side of barrier control solenoid winding 269W, the other side of which is connected to the common power lead CL2A. Accordingly, the piston of air cylinder moves rack 261' rearwardly to close barrier 245.

Switch 275 detects the closed position of the barrier, its resultant actuation connecting contact 275C to normally-open contact 275NO, thereby complexing a circuit to the common contact 279aC of switch 279a, thence via a lead 310 to one side of the winding CR3W of a so-called carry-over relay CR3. Since the other side of this winding is connected to the common lead CL2A, the winding is energized. Switch 279a may be termed the carry-over switch. With the press crankshaft in the starting position, cam 285 causes switch 279a to complete a circuit between its common contact and normally-open contact 279aNO.

The above described operation of relay CR3 closes its contact, completing a circuit between power lead CL1 and a lead 116 and one side of a winding CR4W of a so-called trip relay CR4, thereby closing the contacts of this relay. This completes circuits through respective leads 314 and 315 to supply a suitable voltage $V_c$ (provided to terminals 314' and 315') for energizing the winding 243W of the press clutch solenoid valve. This causes the press crankshaft to begin rotation for a press stroke.

The resultant rotation of cam 285 (e.g., through 15° - 20°) opens the circuit through the contacts of anti-repeat switch 279b. This cuts off a.c. power from lead 104 to lead 103A, permitting de-energization of relay CR1 thereby precluding a further trip actuation of the system until it is reset upon completion of a stamping cycle.

De-energization of relay CR1 permits de-energization of solenoid winding 269W in order that the barrier 245 is opened at the completion of the stamping cycle.

However, as the press continues through its cycle, the circuit through the contacts of switch 279a remains completed, thereby providing a circuit via leads 310 and 312 for maintaining energization of carry-over relay CR3, thereby keeping trip relay winding CR4 energized.

When the press crankshaft reaches about 20° after bottom dead center, the detent in cam 285 causes the circuit through switch 279a to open, depriving a.c. power from relay windings CR3W and CR4W, thus de-energizing air clutch solenoid 243W. Accordingly, the press begins braking to a stop. At its stopped position (ready for a further stamping cycle), the detent in cam 285 once again permits switch 279b to close the circuit between leads 104 and 103A.

In order to reset the system for another stamping cycle, the press operators must remove both hands from actuators 93L and 93R. This removes a.c. power from lead 105, de-energizing relay CR2. This permits a.c. power from lead 102 to be supplied to lead 103, thereby re-energizing relay CR1. Accordingly, the press is ready for another cycle.

c. Jog Mode

When run-jog switch 91 is in the "jog" position, and off-run switch 89 is in the off position, a.c. power is supplied to lead 111 and, through plug and receptacle means 101, to lead 111' extending to normally-open contacts of a power jog pushbutton switch PJS and to one side of relay winding CR5W and also by means of a lead 113, to one blade of a two-pole, double-throw jog mode selector switch JMS shown in the center-off position. This switch permits selection of either power jog operation or manual jog operation.

For power jog operation, switch JMS is placed in the left position. A.C. power on lead 111' energizes relay winding CR5W causing the relay contacts to complete a circuit from power lead CL1, through the closed lower set of contacts of jog mode switch JMS, a lead 114, relay contacts 3CR5 and 1CR5, lead 115 to motor starter winding MSW. Thus the press motor operates. When power jog switch PJS is depressed, a.c. power is supplied from lead 111' through contacts 8CR5 and 6CR5 and via lead 116 to energize trip relay winding CR4W then close to energize air clutch solenoid 243W for as long as power jog switch PJS remains depressed.

Normal jogging requires that jog mode selector switch JMS be placed in the right-hand position. A.C. power from lead 113 is then supplied to lead 116 for energizing the winding of relay CR4. Thus, its contacts close to energize the air clutch solenoid 243W. However, since motor starter winding MSW is not energized, the press does not rotate, the operator being free to rotate the press flywheel by hand. As with the first embodiment, the barrier remains open when the system is in the jog mode, as is desirable.

In view of the foregoing description, it will be seen that the previously-noted objects of the invention are attained by the described embodiments.

Various changes in the apparatus described above might be made without departing from the spirit of the invention. For example, solid state relays may be employed in place of the mechanical relays described. Accordingly, the foregoing description of the preferred embodiments should be considered as exemplary only and should not be construed as limiting the scope of the invention.

We claim:

1. In a stamping press system including a stamping press, said press having a ram, means for driving said ram, ram control means electrically energizable for causing said driving means to drive said ram through a stamping cycle, the improvement comprising the combination of a barrier movable between an open portion permitting access by the hands of a human press operator to the point of stamping operation of said ram and a closed position barring said access, press trip control means, including a pair of actuators each of which is adapted for actuation by a respective one of the hands of said press operator, for causing movement of said barrier to said closed position and energization of said ram control means, thereby to initiate a stamping cycle, in response to substantially simultaneous actuation of said actuators by both hands of said press operator, by substantially simultaneous actuation meaning actuation at least within a short predetermined interval of one another, means for preventing energization of said ram control means, thereby to prevent initiation of a stamping cycle, if said barrier is not in the closed position, and means for preventing re-energization of said ram control means for a further stamping cycle until removal of both of said press operator's hands from said actuators.

2. In a stamping press system as set forth in claim 1, said press having a flywheel and a crankshaft for driving said ram, said ram control means comprising a trip solenoid actuatable, when energized, for coupling a flywheel of the press to a crankshaft for driving said ram.

3. In a stamping press system as set forth in claim 2, said press being of the mechanically-tripped type having a mechanical trip dog for coupling said flywheel to said crankshaft when the trip dog is operated, said trip solenoid operating said trip dog upon being energized.

4. In a stamping press system as set forth in claim 3, said press being of the ari-clutched type having an air-operated clutch for coupling said flywheel to said crankshaft, said trip solenoid causing operation of said air clutch to couple the flywheel to the crankshaft when energized.

5. In a stamping press system as set forth in claim 2, said barrier control means comprising at least one fluid cylinder for moving the press between said open and closed positions, a solenoid valve for controlling the supply of fluid to said cylinder, and trip relay means for controlling the energization of said solenoid valve in response to said actuation by the press operator of said actuators.

6. In a stamping press system as set forth in claim 5, said means for preventing re-energization of said ram control means comprising an anti-repeat relay, said anti-repeat relay being energized when said press ram is in a position ready for initiating a stamping cycle, a switch operating to de-energize said anti-repeat relay upon movement of said ram after initiation of a stamping cycle, said anti-repeat relay being interconnected, when energized, for enabling energization of said trip relay.

7. In a stamping press system as set forth in claim 6, jog circuit means for controlling jogging of said press ram and operative to permit jogging of said ram when said barrier is in said open position, and mode select switch means for selecting either a normal run mode for stamping by said press or a jogging mode of said press controlled by said jog circuit means, but not both.

8. In a stamping press system as set forth in claim 7, an enclosure for being removably secured to said press, said enclosure containing said trip relay and said anti-repeat relay, said enclosure having said actuators and said mode select switch for easy access thereto by said press operator, and means for providing quick and ready connection or disconnection of electrical circuits within and without said enclosure 9. In a stamping press system as set forth in claim 7, said press having an electric motor for driving said flywheel, said press being of the mechanically-tripped type having a mechanical trip dog for coupling said flywheel to said crankshaft when the trip dog is operated, said trip solenoid being energized for jogging by said jog circuit means, and means responsive to selection of said jogging mode for preventing energization of said motor.

10. In a stamping press system as set forth in claim 7, said press having an electric motor for driving said flywheel, said press being of the air-clutched type having an air-operated clutch for coupling said flywheel to said crankshaft, said trip solenoid causing operation of said air clutch to couple the flywheel to the crankshaft when energized, and means, operative when said jogging mode is selected, for selecting and controlling either a power jog mode or a manual jog mode.

11. A barrier-guarded stamping press system comprising a stamping press including a ram and means for driving said ram, ram control means electrically energizable for causing said driving means to drive said ram through a stamping cycle, a barrier movable between an open position permitting access by the hands of a human press operator to the point of stamping operation of said ram and a closed position barring said access, barrier control means electrically energizable for moving said barrier from said open position to said closed position, a circuit for providing power from an a.c. power source to said system, press trip switch means, including a pair of actuators each of which is adapted for actuation by a respective one of the hands of said press operator, for completing an electrical trip circuit in response to concurrent actuation of said actuators by both hands of said press operator, first relay means operative in response to said a.c. power and adapted, when operative, for providing said power to a second relay means, press ram position switch means interconnected with said first relay means for enabling operation of said first relay means when said press ram is in a position ready for a stamping cycle and for thereafter disabling operation of said first relay means after said press ram has moved during a stamping cycle from the ready position, second relay means interconnected with said first relay means and said ram position switch means operative by said a.c. power only upon both operation of said first relay means and completion of said electrical trip circuit, operation of said second relay means causing energization by said a.c. power of said barrier control means thereby to move said barrier from said open to said closed position, barrier safety switch means for detecting the closed position of said barrier, circuit means interconnected with said barrier safety switch means and with said second relay means for energization said ram control means by power from said source to initate a stamping cycle if said barrier is detected in the closed position upon operation of said second relay means, reset circuit means for re-enabling operation of said first relay means at the end of a stamping cycle upon removal of both of said press operator's hands from said actuators, and means for causing said barrier control means to move said barrier from said closed position to said open position upon completion of a stamping cycle.

12. A control system for controlling the operation of a barrier-guarded stamping press, said system comprising ram control means electrically energizable for initiating a stamping cycle of the ram of said press, barrier control means electrically energizable for controlling movement of a barrier between an open position permitting access by the hands of a human press operator to the point of a stamping operation of the press ram and a closed position barring said access, press trip switch means including a pair of actuators each adapted for actuation by a respective one of the hands of said press operator for the completion of an electrical trip circuit in response to concurrent actuation of said actuators by both hands of said press operator, first relay means operative by a source of a.c. power for said control system for providing power from said source for energization of said clutch control means, press ram position switch means interconnected with said first relay means for enabling operation of said first relay means when said press ram is in a position ready for a stamping cycle and for thereafter disabling operation of said first relay means after said press ram has moved during a stamping cycle from the ready position, second relay means operative by power from said source only upon both operations of said first relay means and completion of said electrical trip circuit operation of said second relay means causing energization by power from said source of said barrier control means thereby to move said barrier from said open position to said closed position, barrier safety switch means for detecting the closed position of said barrier, circuit means interconnected with said barrier safety switch means and with said second relay means for energizing said ram control means by power from said source to initiate a stamping cycle if said barrier is detected in the closed position upon operations of said second relay means, reset circuit means for re-enabling operation of said first relay means at the end of a stamping cycle upon removal of both of said press operator's hands from said actuators; and means for causing said barrier control means to move said barrier from said closed position to said open position upon completion of a stamping cycle.

* * * * *